Jan. 16, 1951 J. FANNEN ET AL 2,538,149
TIRE TUBE VULCANIZING UNIT
Filed July 13, 1948 3 Sheets-Sheet 1
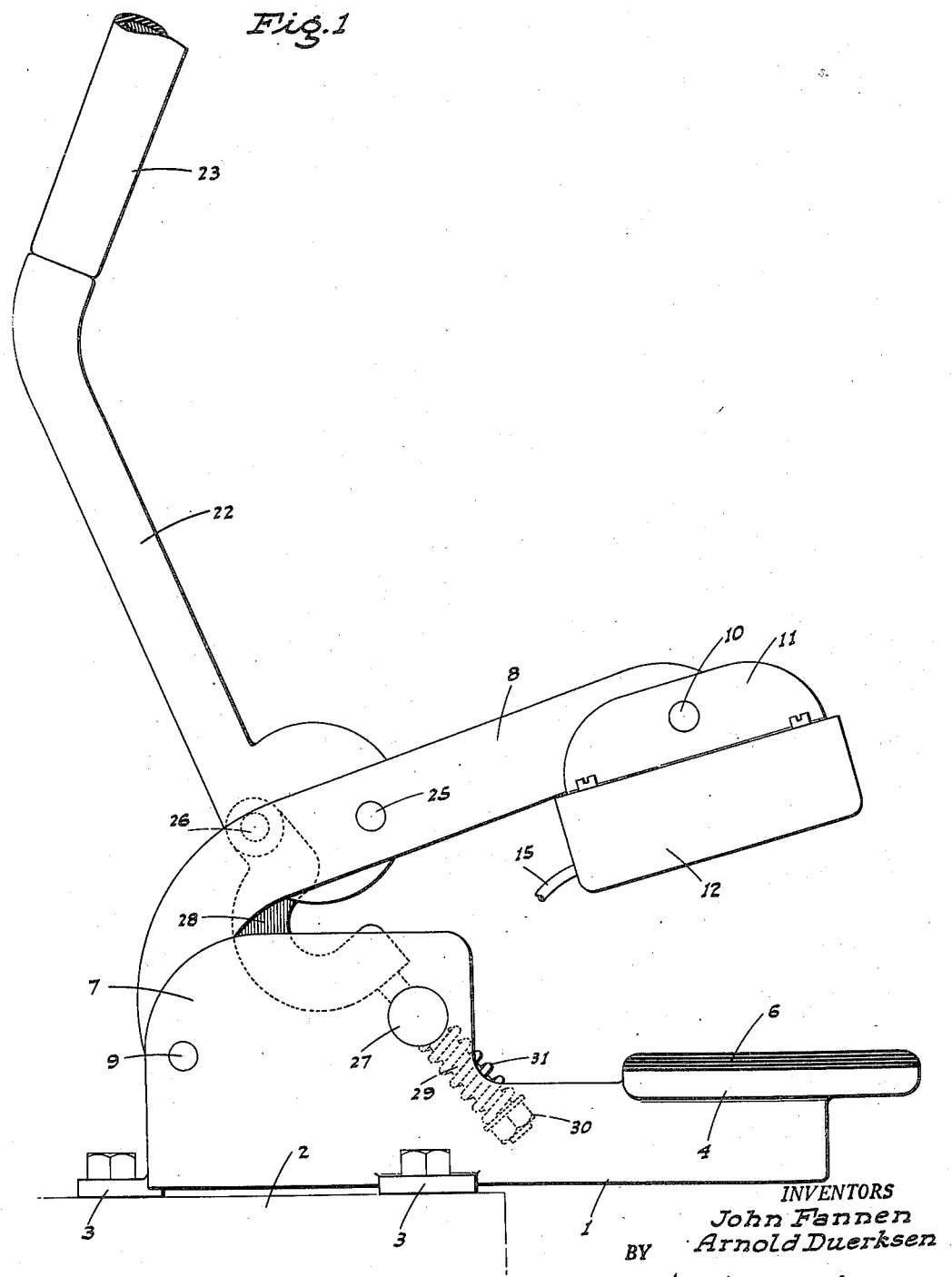
INVENTORS
John Fannen
Arnold Duerksen
BY
ATTYS

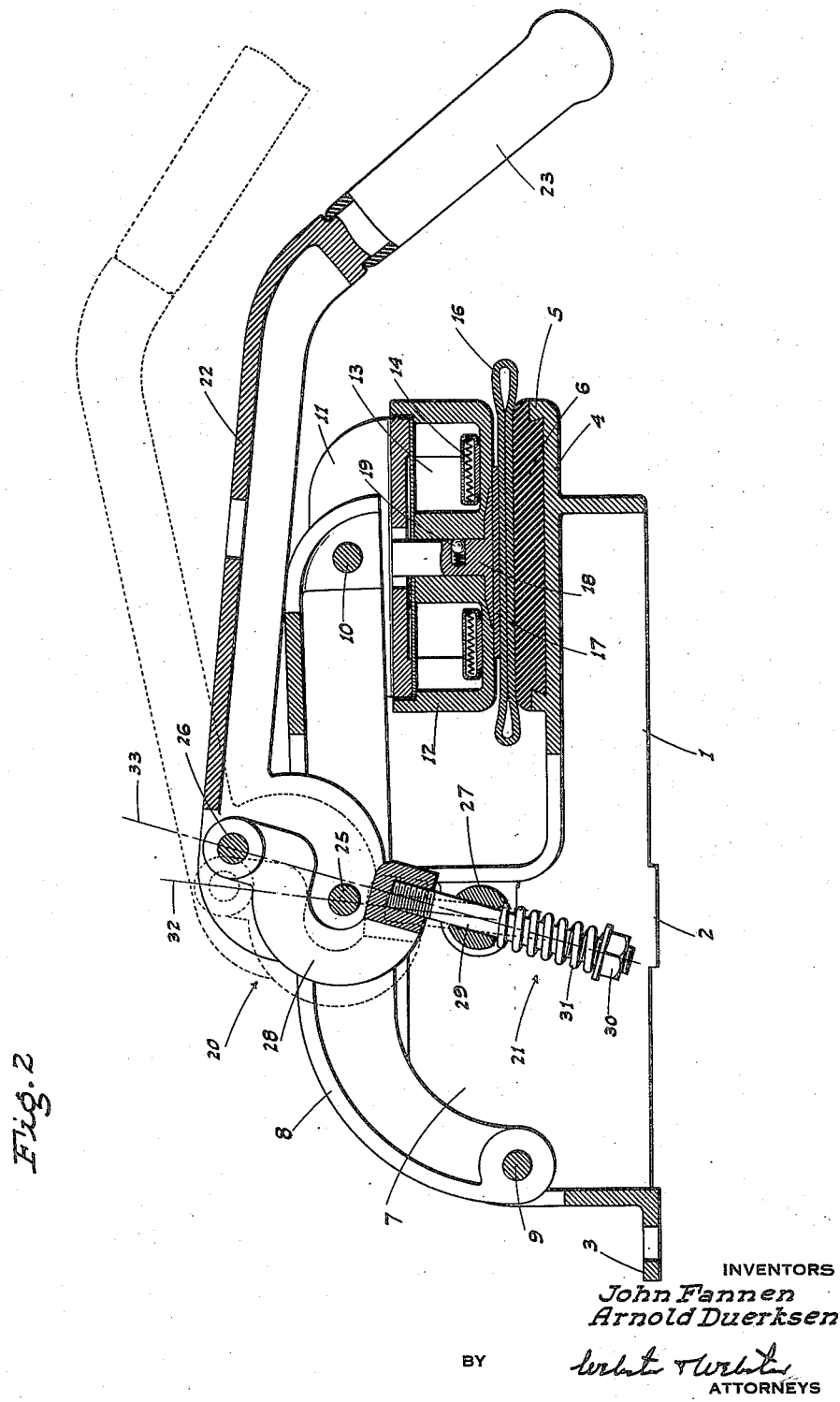

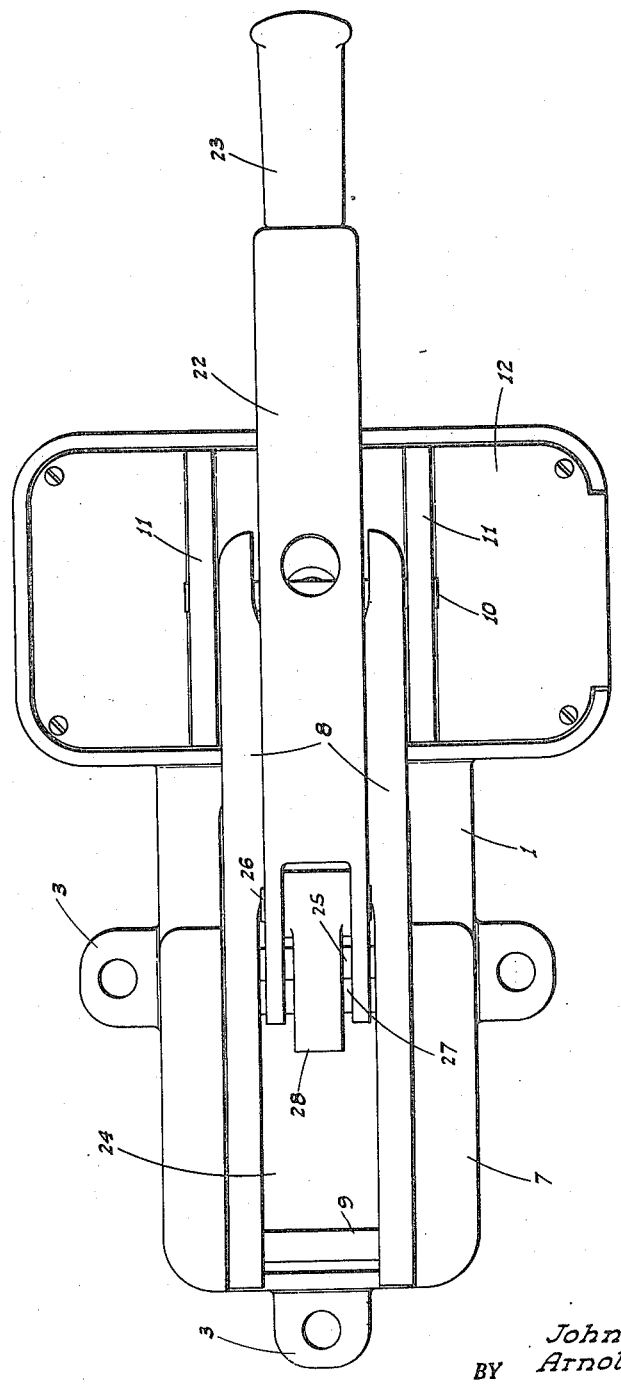

Patented Jan. 16, 1951

2,538,149

UNITED STATES PATENT OFFICE 2,538,149

TIRE TUBE VULCANIZING UNIT

John Fannen and Arnold Duerksen, Lodi, Calif., assignors to Super Mold Corporation of California, Lodi, Calif., a corporation of California Application July 13, 1948, Serial No. 38,473

9 Claims. (Cl. 18—18)

This invention is directed to, and it is an object to provide, an improved tire tube vulcanizing unit for the repair of damaged tire tubes; devices of this general type being known in the trade as "tube plates."

Another object of this invention is to embody, in a tire tube vulcanizing unit which includes a fixed upwardly facing cushion pad and a cooperative heating plate thereabove; a novel, manually controlled mount for supporting and shifting the heating plate between a normally raised position and a lowered, pressure-exerting working position.

A further object of the invention is to provide a tire tube vulcanizing unit, as above, wherein said mount for the heating plate assures of clamping of the tube and the repair stock together in positive, vulcanizing engagement, with the pressure evenly distributed over the repair area.

An additional object of the invention is to provide a mount, as in the preceding paragraphs, which includes, in novel combination, a heating plate supporting swing arm, a normally upstanding handle, and a spring loaded tension unit; the arrangement being such that forward motion of the handle causes the swing arm to move downward and correspondingly move the heating plate, and the spring-loaded tension unit then being in a beyond dead-center position and acting to exert a forceful downward pull on the arm and corresponding pressure on the heating plate.

It is also an object of the invention to provide a tire tube vulcanizing unit, which is operative to impart a constant, positive, and uniform pressure on the repair area of a tire tube clamped between the lower cushion pad and upper heating plate.

A further object of the invention is to provide a practical, convenient, and reliable tire tube vulcanizing unit, and yet one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the device in open or non-working position, i. e. with the heating plate in raised position.

Fig. 2 is a sectional elevation of the device in closed or working position, i. e. with the heating plate in pressure engagement with the repair area of a tire tube clamped between said heating plate and the cushion pad.

Fig. 3 is a plan view of the device.

Referring now more particularly to the characters of reference on the drawings, the device comprises a rigid base 1, elongated to the extent that the rearward portion thereof may be affixed to a bench 2 by means of attachment ears 3, with the forward portion of said base projecting forwardly of the bench in floor overhanging relation.

Such forward portion of the base 1 is fitted, at its outer end and on top, with an upwardly facing platform 4 flanged about its edges, as at 5, to retain an upwardly facing cushion pad 6 disposed on said platform; the pad 6 being of resilient material, such as heavy-duty rubber or the like.

The rearward portion of the base 1 is formed with transversely spaced, upstanding side plates 7, and a swing arm 8, which includes a downwardly curved rear end, is pivoted, at said end, between the side plates 7, as at 9, for swinging of said arm in a vertical plane.

From the pivot 9 the swing arm 8 extends forwardly to a termination above the cushion pad 6. At its forward end said swing arm 8 is transversely pivotally connected, as at 10, between upstanding, transversely spaced webs 11 on top of a heating plate 12.

The heating plate 12 is a two-part metallic box, as shown, which includes an internal chamber 13 in which resistance type, electric heating elements 14 are disposed. Electricity is supplied to the heating elements 14 by means of a flexible cord 15 which leads into the chamber 13 from exteriorly of the heating plate 12.

The swing arm 8 and heating plate 12 are normally in the raised, open or non-working position of Fig. 1. When the swing arm 8 is moved downwardly from such position, the parts assume the lowered, closed, or working position of Fig. 2, wherein a tire tube 16 and the applied repair stock 17 are forcefully and positively clamped between said heating plate 12 and the cushion pad 6. The pivotal mounting of the heating plate 12, coupled with the resistive resiliency of the cushion pad 6, assure that the pressure is evenly distributed over the repair area of the tube, as is desirable to effective vulcanization.

The lower or working face of the heating plate 12 is normally flat and unbroken, but for the repair or vulcanization of tube stems there is a removable insert 18 normally held in place by a spring-pressed detent 19. Upon removal of the insert 18, a valve stem may be engaged in the opening for vulcanization to a tube 16.

The swing arm 8 and supported heating plate 12 are controlled, and pressure applied thereto when the device is in working position, by a novel handle-manipulated mount, indicated generally at 20, and which includes a spring-loaded tension unit, indicated generally at 21; such mount being constructed as follows:

A normally upstanding handle 22 having a grip 23 at its upper end extends, at its lower end, through a longitudinal slot 24 in the swing arm 8 intermediate its ends and generally above the rearward portion of the base 1. The lower end of the handle 22, which is in the slot 24, is pivoted in connection with the swing arm 8 by a cross pin 25, whereby said arm is swingable from said upstanding position, as in Fig. 1, to a forward and slightly downwardly inclined position, as in Fig. 2.

In normally rearwardly offset relation to the pivot pin 25, the handle 22 is fitted with another cross pin 26. The spring-loaded tension unit, indicated generally at 21, is connected between the cross pin 26 and an enlarged cross pin 27 turnably mounted in connection with, and extending between, the side plates 7 in a transverse vertical plane normally ahead of said cross pin 26. The spring-loaded tension unit 21 comprises the following:

A forwardly opening semi-circular connector link 28 is journaled at its upper end on the cross pin 26, while the lower end of said connector link includes a fixed spindle 29 which extends radially and in slidable relation through the cross pin 27 to a termination some distance therebeyond.

A nut 30 is threaded on the lower end of the fixed spindle 29, and a relatively heavy-duty compression spring 31 is disposed about said spindle between the nut 30 and the cross pin 27.

When the handle 22 is in its normal upstanding position, as in Fig. 1, the spring 31 is relatively unloaded and the parts remain substantially in balance, as shown.

However, upon swinging of the handle forwardly and downwardly from the upstanding position of Fig. 1 to the lowered position of Fig. 2, the pivot pin 25 relatively lowers and the pivot pin 26 relatively raises, with the result that the swing arm 8 is swung downwardly until the heating plate 12 bears on the tube 16 and clamps it between said heating plate and the cushion pad 16. With such movement the tension unit 21 swings forwardly until the connector link 28 straddles the cross pin 25, and at which time the compression spring 31 has been placed under considerable load.

The dead-center line between the pivot pin 25 and the pivot pin 26 is illustrated at 32, and when the line of pull of the spring, as represented by the line 33, passes forwardly of the dead-center line 32, said tension unit 21 then acts to snap the arm 8 and heating plate 12 downwardly, and to maintain said plate in positive forceful engagement with the work.

To release the device, it is only necessary to swing the handle 22 upwardly, and as soon as the line of pull 33 is behind the dead-center line 32, the spring automatically returns the parts to their normal or starting position, with the device open.

The described tire vulcanizing unit is convenient to use, and provides an effective and practical device for the repair of damaged tire tubes; the vulcanization being accomplished properly and with even distribution of the pressure on the repair area.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A tire tube vulcanizing unit including a base, an upwardly facing tube supporting platform on the forward portion of the base, a longitudinal swing arm pivoted at its corresponding end to the rearward portion of the base and extending forward therefrom, a heating plate on the swing arm overhanging the platform, the swing arm being normally raised with the heating plate clear of the platform, a normally upstanding handle pivoted at its lower end to the swing arm at a point between the heating plate and the pivot point of the swing arm on the base and effective to be swung downwardly and forwardly relative to the base, and mechanism connected between the handle and base operative to impose a yieldable, downward and continuing load on the swing arm upon forward motion of the handle beyond a certain point.

2. A tire tube vulcanizing unit including a base, an upwardly facing tube supporting platform on the forward portion of the base, a longitudinal swing arm pivoted at its corresponding end to the rearward portion of the base and extending forward therefrom, a heating plate on the swing arm overhanging the platform, the swing arm being normally raised with the heating plate clear of the platform, a normally upstanding handle pivoted at its lower end to the swing arm at a point between the heating plate and the pivot point of the swing arm on the base and effective to be swung downwardly and forwardly relative to the base, and mechanism connected between the handle and base operative to impose a yieldable, downward and continuing load on the swing arm upon forward motion of the handle beyond a certain point; said mechanism comprising a spring-loaded tension unit.

3. A tire tube vulcanizing unit including a base, an upwardly facing tube supporting platform on the forward portion of the base, a longitudinal swing arm pivoted at its corresponding end to the rearward portion of the base and extending forward therefrom, a heating plate on the swing arm overhanging the platform, the swing arm being normally raised with the heating plate clear of the platform, a normally upstanding handle pivoted at its lower end to the swing arm at a point between the heating plate and the pivot point of the swing arm on the base and effective to be swung downwardly and forwardly relative to the base, and mechanism connected between the handle and base operative to impose a yieldable, downward and continuing load on the swing arm upon forward motion of the handle beyond a certain point; said mechanism comprising a spring-loaded tension unit, and said unit being pivoted at one end to the handle and at the other end to the base.

4. A tire tube vulcanizing unit, as in claim 3, in which the pivots of the handle to the arm, and said tension unit to the handle, are disposed so that said unit passes a dead-center position, and is held under tension, when the handle is forward of said point.

5. A tire tube vulcanizing unit including a base, an upwardly facing tube supporting platform on the forward portion of the base, a longitudinal swing arm pivoted at its corresponding end to the rearward portion of the base and extending forward therefrom, a heating plate on the swing arm overhanging the platform, the swing arm being normally raised with the heating plate clear of the platform, a normally upstanding handle pivoted at its lower end to the swing arm at a point between the heating plate and the pivot point of the swing arm on the base and effective to be swung downwardly and forwardly relative to the base, and a spring-loaded tension unit connected between the handle at a point normally rearward of the handle pivot, and a lower point on the base; said tension unit passing dead-center with respect to the handle pivot upon forward motion of the handle beyond a predetermined point, and thence said unit imposing a yieldable, downward, and continuing load on the swing arm.

6. A tire tube vulcanizing unit, as in claim 5, in which the tension unit is connected to the base at a point normally ahead of the point of connection to the handle.

7. A tire tube vulcanizing unit including a base, an upwardly facing tube supporting platform on the forward portion of the base, a longitudinal swing arm pivoted at its corresponding end to the rearward portion of the base and extending forward therefrom, a heating plate on the swing arm overhanging the platform, the swing arm being normally raised with the heating plate clear of the platform, a normally upstanding handle pivoted at its lower end to the swing arm for forward and downward motion, a dependent link pivoted at its upper end to the handle at a point normally rearward of the point of the handle pivoting to the swing arm, and a spring connected to the link in a manner to urge it downwardly; the tension unit comprised of said link and spring passing dead-center with respect to the handle beyond a predetermined point, and thence said unit imposing a yieldable, downward, and continuing load on the swing arm.

8. A tire tube vulcanizing unit including a base, an upwardly facing tube supporting platform on the forward portion of the base, a longitudinal swing arm pivoted at its corresponding end to the rearward portion of the base and extending forward therefrom, a heating plate on the swing arm overhanging the platform, the swing arm being normally raised with the heating plate clear of the platform, a normally upstanding handle pivoted at its lower end to the swing arm for forward and downward motion, a dependent link pivoted at its upper end to the handle at a point normally rearward of the point of the handle pivoting to the swing arm, a spindle projecting downward from the lower end of the link, a turnable cross pin on the base normally forward of the point of connection of the link with the handle, the spindle slidably projecting through the turnable cross pin, a head on the spindle below the cross pin, and a compression spring on the spindle between said cross pin and head; the tension unit comprised of said link and spring-urged spindle passing dead-center with respect to the handle pivot upon forward motion of the handle beyond a predetermined point, and thence said unit imposing a yieldable, downward, and continuing load on the swing arm.

9. A tire tube vulcanizing unit, as in claim 8, in which the link is of forwardly-opening, generally C-shape, and said link encompassing the pivot between the handle and arm, when said tension unit passes forward of dead-center.

JOHN FANNEN.
ARNOLD DUERKSEN.

REFERENCES CITED

The following references are of record in the file of this patent:

UNITED STATES PATENTS

| Number | Name | Date |
| --- | --- | --- |
| 1,204,021 | Horsey | Nov. 7, 1916 |
| 2,350,034 | Herrington | May 30, 1944 |
| 2,426,767 | Dupont | Sept. 2, 1947 |